Oct. 27, 1959 L. T. LA PATKA 2,910,672

MAGNETIC MEMORY UNIT

Filed April 5, 1956

*INVENTOR.*
LAWRENCE T. LAPATKA
*BY*
Carl Fissell Jr.
AGENT

United States Patent Office 2,910,672

Patented Oct. 27, 1959

2,910,672

MAGNETIC MEMORY UNIT

Lawrence T. La Patka, Collingswood, N.J., assignor to Burroughs Corporation, Detroit, Mich., a corporation of Michigan Application April 5, 1956, Serial No. 576,408

1 Claim. (Cl. 340—174)

This invention relates to magnetic core packages and more particularly to a novel magnetic memory unit adapted for assembly into a multi-unit array.

Generally, a magnetic memory unit of the type herein described includes magnetic cores and unidirectional circuit elements such as diodes packaged together in an insulating housing provided with means on its exterior for interconnecting one unit with another, or with other equipment.

Prior art devices of this type incorporate the various components within a housing wherein they are relatively inaccessible for repair or replacement when any of the parts fail in service, the diodes being the one component most subject to failure.

Many times these memory units are detachably joined together in a stacked array. Failure of units in the array and more particularly of an intermediate unit presents a serious service problem because the whole array must then be disassembled and each unit opened in order to locate the faulty component within the housing enclosure.

It is an important object, therefore, of the present invention to provide a novel magnetic memory unit which is adapted for stacking in an array in a manner avoiding the aforementioned problems.

It is a further important object of the invention to provide a memory unit having means for external testing and service of certain of its components.

It is a still further object of the invention to provide a novel magnetic memory unit in which certain components thereof are accessible for service, testing and replacement from the exterior of the unit housing without disassembly of either the array or of the independent units.

It is another object of the invention to provide a novel magnetic memory unit in which certain of the components, while disposed on the exterior of the housing of the unit do not increase the overall area encompassed thereby.

Still another object of the invention is to provide a novel magnetic memory unit which is simple and inexpensive to manufacture, which is relatively small in size, and which may be simply and efficiently stacked in a multi-unit array.

In accordance with the present invention there is provided a magnetic memory unit comprising an electrically insulating, non-magnetic housing member having a recess therein occupying a substantial portion of the housing. Means are provided within the recess to accommodate one or more magnetic cores. A plurality of electrically conductive receptacles or sockets are disposed within the housing with their access openings flush with one side of the housing. A plurality of electrical plugable conductors are insulatingly supported within the housing in spaced relation to said receptacles with one end extending from the opposite side of the housing through its cover. A feature of the invention is the provision in the housing of a reentrant portion within which diodes are detachably supported.

Further objects, features and advantages will become more readily apparent as the description of a preferred embodiment of the invention proceeds.

Referring now to the drawings.

The magnetic memory unit forming the illustrated embodiment of the invention herein described takes the form generally of a sub-assembly which is functionally useful in various services, such as computing equipment and similar apparatus. For example, the device may find application as a shift register, a magnetic counter, or as a flip-flop device in certain control circuitry.

Figure 1:
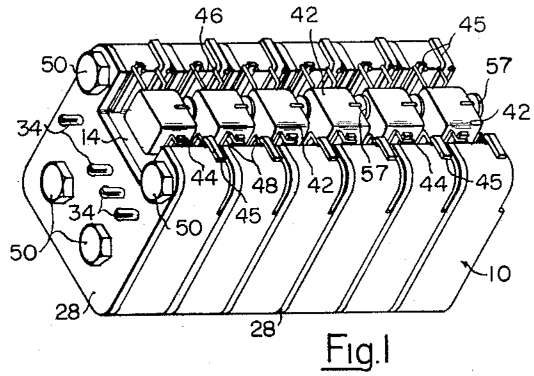
Fig. 1 is an isometric view of a plurality of magnetic memory units embodying concepts of the present invention stacked in assembly or array.
Figure 2:
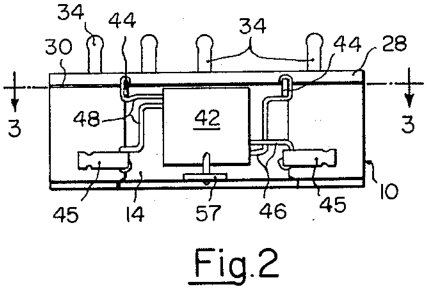
Fig. 2 is a top plan view of one of the memory units.

Referring to Fig. 1 of the drawing, there is shown a preferred form of the present invention comprising a group of six memory units each indicated generally at 10 and adapted by means, which will be described later on, to be stacked together in side by side abutting relation so as to form an array, as shown. It should be understood, of course, that each of the memory units is capable of individual application in certain electrical circuitry as will be more apparent as the description proceeds. However, the embodiment illustrated herein is particularly adapted for use in a stacked array to form what is commonly known as a magnetic shift register. It is to be noted that the novel configuration of each of the memory units permits exterior servicing and testing of the interior component elements by virtue of the unusual construction of the device.

Figure 3:
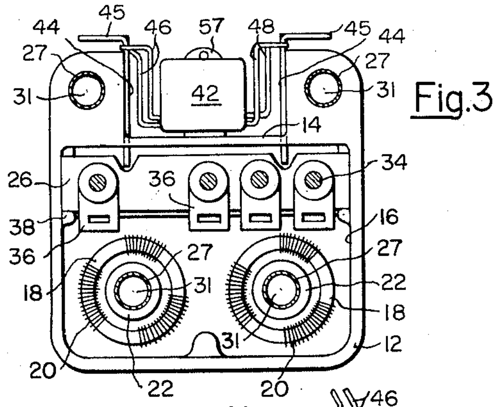
Fig. 3 is a view taken along the line 3—3 of Fig. 2.
Figure 4:
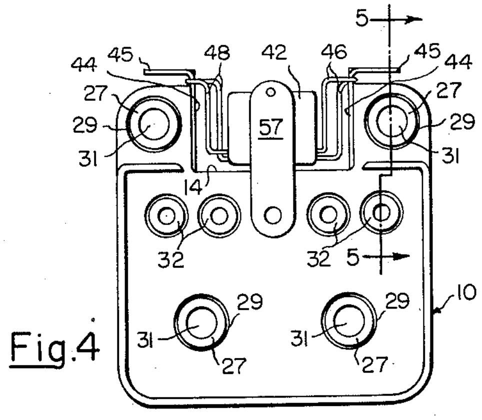
Fig. 4 is a view similar to Fig. 3 but of the reverse or receptacle side of the memory unit.

With reference to Fig. 3 it is seen that the memory unit includes an insulating non-magnetic housing member 12 which is substantially square in configuration. It is to be understood, however, that the actual shape of the device can be varied to accommodate its disposition in other equipment with which it might be associated. Although the housing 12 may be made of any suitable insulating material, it is preferably formed of hardened plastic material molded into the desired shape.

A desirable feature of the invention is the reentrant portion 14 provided in the housing and within which certain of the operating components are disposed as will be described later. The reentrant portion is preferably located in one side edge of the housing midway between the two adjacent corners thereof. A central recess 16 provided in housing 12, occupies a substantial portion of the housing and is adapted to accommodate magnetic cores 18 having electrical windings 20 thereon, only two such cores being used in the embodiment illustrated. Inasmuch as the cores are of the so called toroidal or annular type, two integrally formed hollow pedestals 22 have been provided in housing 12, the cores being slipped over these pedestals and seated thereon.

Figure 6:
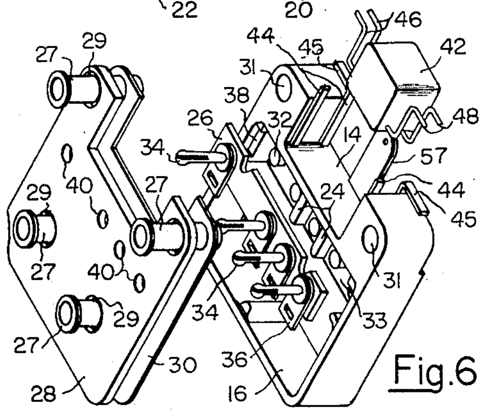
Fig. 6 is an exploded isometric view of the memory unit but omitting the magnetic cores.

Disposed immediately adjacent to the core supporting pedestals 22 are a pair of spaced ribs 24 shown most clearly in Fig. 6, which may be integrally formed with the insulating housing to receive and support an insulating member or strip 26 thereon. The strip 26 is preferably formed of hardened plastic material and is disposed with the recess 16 transversely across one dimension of the housing, the width as shown. A cover member or plate 28, also of electrical insulating material, is provided as a closure for housing 12. A resilient moisture impervious element 30 is interposed between cover 28 and the housing to seal the recessed interior of the housing from the external atmosphere.

Figure 5:
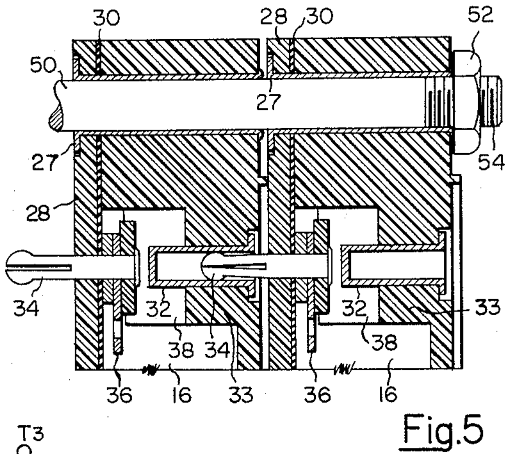
Fig. 5 is an enlarged sectional view of a portion of the device of Fig. 4, the view being taken along the line 5—5 thereof.

As earlier described, each memory unit is, or may be, pluggably engaged with other similar memory units. To this end a plurality of sleeve-shaped receptacles or sockets 32 are provided with the access opening of each socket disposed substantially flush with the outer surface of the back wall of the housing member 12. Each socket is mounted in a thickened wall portion 33 of the housing and the mounting is such that the inner end of the socket projects into recess 16 as shown in Figs. 5 and 6, for electrical connection to various components therein. The inner ends of the sockets 32 may serve as terminals to which electrical leads may be soldered or otherwise attached for connection to other circuit components in the unit.

A plurality of pluggable conductors 34 have their bases secured to the insulating strip 26 and have their outer ends split to provide sufficient retaining tension when engaged in a mating receptacle or socket 32 of another unit. Each pluggable conductor is provided at its base with a laterally projecting tab 36 serving as a separate electrical terminal for suitable attachment of electrical lead wires (not shown) so as to interconnect the same with various electrical components of the device. The insulating strip 26 is adapted, by means of the oppositely disposed side wall ledges 38 and the intermediate ledges 24—24 previously mentioned, to be maintained over but in spaced apart relation to the inner ends of sockets 32.

The cover 28 is secured to the housing by means of hollow rivets 27 disposed through holes 29 and 31 in the cover and housing respectively. The cover plate 28 is provided with apertures 40 registrable with the pluggable conductors 34 and through which the latter may extend. As may be seen by comparing Figs. 5 and 6, when the cover member 28 is secured to the housing 12 each of the pluggable conductors 34 extends through its respective aperture 40 in the cover, and projects away from the housing. When the memory units are stacked together the projecting conductors 34 enter the sockets 32 as shown in Fig. 5.

In order to secure multiple magnetic memory units together to form a rigid assembly a stiffening member or bolt 50 is passed through each of the aligned rivets 27 of the units after which nuts 52 are tightened over the threaded ends 54 of the bolts to draw the units tightly together into a rigid unitary assembly.

One of the more serious service problems concerning memory units of the prior art type arises by reason of the failure in service of the undirectional electrical devices, i.e. diodes, which are used therewith. As mentioned earlier, it has been the practice in the past to package both the magnetic cores and their associated diodes within the confines of the mounting package. It is at once apparent that when multi-memory units of this latter type are stacked together in an array, servicing, testing or removal of a faulty diode requires complete disassembly of the array and the individual memory unit in which the diode is located as well.

Figure 7:
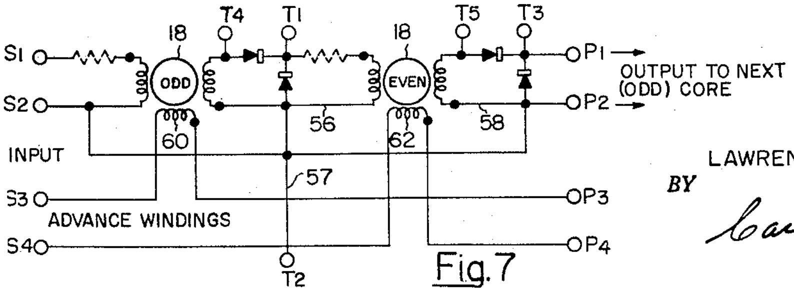
Fig. 7 is a schematic view illustrating one embodiment of an electrical circuit employing the memory units herein described.

An important feature of the present invention is the provision of a novel construction which permits the disposition of the diode or diodes, as the case may be, externally of the housing which encloses the magnetic cores but still within the area bounded by the housing. That is to say, the external attachment of the diodes to the housing in the present embodiment of the invention does not increase the overall area of the housing. This latter feature is made possible by the before-mentioned recess or reentrant portion 14 in housing 12. The diode package 42, which in the present embodiment of the invention constitutes a small plastic globule containing the four diodes shown in the circuit diagram of Fig. 7, is readily accommodated in this recess. Further, as the diodes and the magnetic cores may require checking or testing, the lead wires from the windings on the cores are brought out to separate busses 44, four of which are shown in Fig. 6, which are arranged to extend from the core recess 16 upwardly along the two opposite side walls of the reentrant portion and may project slightly therebeyond as shown. As shown in Fig. 6, two busses 44 extend in parallel relation along each side wall of the reentrant portion 14. One bus on each side wall may be provided with an outward laterally bent extension 45 to provide a terminal connection.

The diode package 42 has a pair of lead wires on each side thereof identified at 46 and 48. The lead wires 46—48 of the diode package are arranged in alignment with the busses 44 and can be simply and readily soldered or otherwise fastened to their respective busses. The busses 44 and leads 46—48 provide means for flexibly protectingly supporting the diode package within the reentrant portion 14. It is also apparent that the overall size of the magnetic unit package has not been increased although the diode package itself is now disposed externally of the housing. If for any reason it becomes necessary to test or remove the diode package this can be performed quite simply and readily without unnecessarily disturbing either the memory array or the individual unit. For removal of a diode package it is very easy to sever the leads 46 and 48 and replace the same with another similar package. The diodes and cores are thus made readily accessible for service and for replacement by virtue of this invention.

For additional testing purposes or for tapping into the array of memory units at different places therealong, each unit may be provided with an electrically conductive strap 57 projecting upwardly from one of the sockets 32 to which it is connected to a position lying along side of and projecting slightly above the diode package.

A suitable electrical circuit employing the present invention is set forth schematically in Fig. 7. This circuit is substantially similar to the "Static Magnetic Delay Line" of An Wang et al. described in detail in the "Journal of Applied Physics," January 1950, on pages 49–54. Briefly described, however, the magnetic cores 18, denoted in Fig. 7 by the circles identified as "odd" and "even," are, or may be, coupled together by means of a diode transfer loop 56. A portion of a second transfer loop 58 for connection to the next adjacent core unit is also shown. The odd and even cores, only one set of each being illustrated herein, are each laced with an advance winding 60—62. The input terminals for these latter windings are identified at $S_1$ to $S_4$ and comprise the sockets 32. These windings are alternately pulsed. The data or information is stepped or shifted through the core register by transferring the contents of the "odd" cores to the "even" cores by exciting the advance winding $S_3$ and then from the "even" cores to the "odd" cores by exciting the advance winding $S_4$. The even cores are required to provide delay and may be replaced by inductive-capacitive delay lines. The terminals for the output plugs 34 are identified at $P_1$ to $P_4$.

It is now clear, from the above description that the invention provides a novel magnetic memory unit capable of being stacked in multiple unit arrays and which can be tested, serviced and repaired quickly and efficiently and without disassembly of the package or parts.

What is claimed is:

A magnetic memory unit comprising in combination, an electrically insulating non-magnetic housing member of substantially rectangular configuration including a bottom wall and four connected side walls joined to the bottom wall and projecting perpendicularly therefrom, an electrically insulating non-magnetic closure member sealing the open side of the housing member, means in the interior of the housing member for insulatingly supporting a pair of magnetic cores, each core having one or more electrical windings thereon, a plurality of electrical terminal sockets within the housing member each with its access opening flush with the outer side of said bottom wall, a plurality of electrical pluggable conductors, a removable dielectric strip disposed transversely across one dimension of the housing member and bridging the inner ends of said sockets, said strip forming a common support for the bases of said pluggable conductors and supporting the same in a row within a recessed portion of the interior of the housing member so that the outer ends of the pluggable conductors project through and beyond the closure member and each aligned with one of said sockets, said closure member having apertures through which said conductors extend, one of the side walls of said housing member being substantially thicker than the remaining side wall thereof and provided with a reentrant portion forming an external notch therein, said closure member having a similar notch in substantial registration with the notch in the side wall, one or more unidirectional circuit elements having exposed lead wires, a plurality of exposed electrically conductive busses disposed on opposite side walls of said notch, said unidirectional elements being connected to said busses by means of said lead wires and flexibly supporting the same within the notches thereby rendering the elements accessible to the outside of the unit for test and replacement but protectingly recessed within the notches, means extending from said busses into the interior of the housing member for electrical interconnection with said core windings, and a conductive circuit element projecting perpendicularly away from the base of said notch and electrically connected to one of said sockets and said windings thus to provide means for testing said cores.

References Cited in the file of this patent

UNITED STATES PATENTS

| | | |
|---|---|---|
| 2,150,388 | Martindell | Mar. 14, 1939 |
| 2,446,701 | Greene | Aug. 10, 1948 |
| 2,694,249 | Kapp | Nov. 16, 1954 |
| 2,702,879 | Wheeler | Feb. 22, 1955 |
| 2,783,416 | Butler | Feb. 26, 1957 |

OTHER REFERENCES

An article entitled "Magnetic-Storage Elements," published in "Instruments and Automation," page 900, vol. 27, June 1954.